United States Patent
Watanabe et al.

(10) Patent No.: US 6,734,395 B2
(45) Date of Patent: May 11, 2004

(54) FLUX-CORED WIRE FOR STAINLESS STEEL ARC WELDING

(75) Inventors: Hirohisa Watanabe, Fujisawa (JP); Hiroshi Shintate, Fujisawa (JP)

(73) Assignee: Kabushiki Kaisha Kobe Seiko Sho, Kobe (JP)

(*) Notice: Subject to any disclaimer, the term of this patent is extended or adjusted under 35 U.S.C. 154(b) by 0 days.

(21) Appl. No.: 10/419,180

(22) Filed: Apr. 21, 2003

(65) Prior Publication Data

US 2003/0196997 A1 Oct. 23, 2003

(30) Foreign Application Priority Data

Apr. 23, 2002 (JP) ......................................... 2002-121401

(51) Int. Cl.$^7$ .............................................. B23K 35/02
(52) U.S. Cl. ................................. 219/145.22; 219/146.1
(58) Field of Search ......................... 219/145.22, 146.1, 219/146.23, 145.1

(56) References Cited

U.S. PATENT DOCUMENTS 5,580,475 A * 12/1996 Sakai et al. ............ 219/145.22
6,340,396 B1 * 1/2002 Ogawa et al. ................. 148/23

FOREIGN PATENT DOCUMENTS

| JP | 56-86699 | 7/1981 | | |
| JP | 63-13695 | 1/1988 | | |
| JP | 409122977 A | * 5/1997 | ......... | B23K/35/368 |
| JP | 2001-138092 | 5/2001 | | |

* cited by examiner

Primary Examiner—M. Alexandra Elve
(74) Attorney, Agent, or Firm—Oblon, Spivak, McClelland, Maier & Neustadt, P.C.

(57) ABSTRACT

A flux-cored wire for stainless steel arc welding having flux filled up in an outer metal sheath made of stainless steel, comprises: as percentage to total weight of the wire, $TiO_2$ 5.5 through 10.0 mass %, $SiO_2$ 1.5 through 3.0 mass %, $Al_2O_3$ 0.5 through 1.5 mass %, and fluorine compound (by a value expressed in terms of fluorine) 0.10 through 0.15 mass %, and an amount of $ZrO_2$ is limited to no more than 0.1 mass %, and it has a flux rate of 25 through 45%, and a total amount of slag forming ingredient is 8 through 14 mass % as a percentage to total weight of the wire, and thereby to provide excellent welding workability especially in welding of a thin sheet stainless steel.

6 Claims, 1 Drawing Sheet

FLUX-CORED WIRE FOR STAINLESS STEEL ARC WELDING

BACKGROUND OF THE INVENTION

1. Field of the Invention

The present invention relates to a flux-cored wire for stainless steel arc welding that has an outer metal sheath of stainless steel, and is used for welding of stainless steels, dissimilar welding between stainless steels and carbon steels or low alloy steels, underlaying welding in a side of cladding materials of stainless-clad steel, and underlaying welding when in build-up welding of stainless steel weld metals to carbon steels or low alloy steels. Specifically, it relates to a flux-cored wire for stainless steel arc welding exhibiting outstanding welding workability in welding in such a small current as a welding current of no more than 150A, and simultaneously having excellent re-arc startability.

2. Prior Art

Under recent demand for outstanding welding workability and high welding efficiency, a flux-cored wire electrode having these characteristics has increasingly been used. In particular, flux-cored wire electrodes are frequently used in welding of stainless steels. There have been developed flux-cored wire electrodes having a composition adapted to various kinds of base materials, and flux-cored wire electrodes adapted to various welding postures.

In a field of stainless steel, so-called welding of a thick sheet is very rare, and thin sheet welding is performed in many cases. Especially in welding of sheets having a thickness of no more than 3 mm, wires having a thin diameter, such as of 0.8 mm or 0.9 mm, are commonly used.

JP-A No.63-13695 discloses a flux-cored wire electrode having outstanding welding workability in a field of welding of such a small current region as welding currents of 80 through 150 A. Although this technique adopts a wire having a diameter of 0.8 mm in welding about 2 mm of sheet thickness, it is difficult to apply this technique to a wire having a diameter of 1.2 mm.

Manufacturing flux-cored wire for stainless steel arc welding, as understood from JP-A NO. 56-86699, confronts a situation in which thinner the diameter of wires, more difficult in manufacturing the same, thus requiring such a heat-treatment as annealing during wire drawing processing, suffering from high production and supplying cost as compared with wires having diameters of 1.2 mm or 1.6 mm.

To solve the problems, the present invention aims at providing a flux-cored wire for stainless steel arc welding exhibiting excellent welding workability especially for thin sheet stainless steel.

SUMMARY OF THE INVENTION

In one aspect, a flux-cored wire for stainless steel arc welding according to the present invention has flux filled up in an outer metal sheath made of stainless steel, wherein the flux includes, as percentage to total weight of the wire, $TiO_2$: 5.5 through 10.0 mass %, $SiO_2$: 1.5 through 3.0 mass %, $Al_2O_3$: 0.5 through 1.5 mass %, and fluorine compound (by a value expressed in terms of fluorine): 0.10 through 0.15 mass %, and wherein the flux has a flux rate of 25 through 45%, and a total amount of slag forming ingredient is 8 through 14 mass % as a percentage in the total weight of the wire. It should be noted here that an amount of $ZrO_2$ is limited to no more than 0.1 mass % as a percentage in the total weight of the wire.

According to the aspect of the present invention, as welding materials for thin sheet stainless steel, the flux-cored wire for stainless steel arc welding is excellent not only in welding workability in a low current region but also in welding workability in a current region usually used. Therefore, the present invention may contribute to wide spread use of the flux-cored wire electrode and also contribute to improvement in workability.

According to another aspect of the present invention, it is effective that the flux-cored wire for stainless steel arc welding is applied to wires having diameters of no less than 1.2 mm.

In still another aspect of the present invention, it is more preferable that the flux rate is set to be 30 through 40%.

In yet another aspect of the present invention, it is more preferable that a total amount of slag forming ingredient included in the flux is set to be 9 through 12 mass % in a total weight of the wire.

Figure 1:
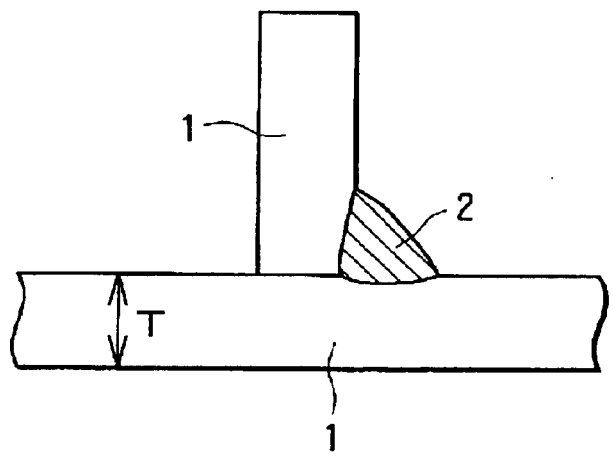
FIG. 1 shows a test method evaluating welding workability and re-arc startability in level fillet test sheet having 2 mm of sheet thickness.

Other and further objects, features and advantages of the invention will appear more fully from the following description.

DETAILED DESCRIPTION OF THE PREFERRED EMBODIMENTS

Preferred embodiments of the present invention will be described. Conventionally, welding a thin sheet stainless steel with the use of a flux-cored wire for stainless steel arc welding having a diameter of 1.2 mm faced a necessity for a welding current to be no more than 120 A on a condition that a sheet has a thickness of no more than 3 mm. In such a current region, however, problems occurs that a large globule easily formed at a tip of a wire interfering smooth transfer of the globule, leading to increased spatter formation and also to an unstable bead form.

Various experiments and investigation repeatedly performed by the present inventors in order to stabilize arc condition in a low current region revealed that a flux rate designed to be high, an outer metal sheath thickness set to be thin, and an increased current density improve arc condition even when using a comparatively thick wires having a diameter of 1.2 mm.

However, in welding with the same current, there occurred a problem that an outer metal sheath designed to be thin raised electric resistance per unit length of a wire, and increased an amount of weld metals as compared with a case where a wire of usual diameter of 1.2 mm whose outer metal sheath was not designed to be thin was used. In particular, since an outer metal sheath of stainless steel has a higher electric resistance than an outer metal sheath of carbon steel, it provides remarkable increase in a deposition rate (amount of weld metals g/minute per unit time). Practically, increase in an amount of a weld metal raises heat contraction of the weld metal even in welding in a low current region, suffering from increased deformation of a base material.

A further experiments and investigation by the present inventors in order to overcome this disadvantage revealed that increase in an amount of slag forming ingredients enables an amount of a weld metal to be adjusted to a proper level even in designing for a high flux rate. Usually, since an excessive amount of slag easily forms weld defects such as slag inclusion and impairs X-ray soundness, it is required that an amount of slag is adjusted to a proper amount. Slag removability and re-arc startability are important especially in the light of thin sheet welding. The experiments and investigation also revealed that even in designing for a high flux rate, selection of a specific flux component system gave outstanding arc stability and excellent bead form in welding of a thin sheet stainless steel by a low current, and simultaneously welding workability of excellent slag removability and superior re-arc startability.

Hereinafter, still more detailed description will be given about a flux-cored wire for stainless steel arc welding of the present invention. First, description is given about a composition of a flux.

"$TiO_2$: 5.5 through 10.0 mass %"

$TiO_2$ is a main slag forming ingredient in the present invention, improves fluidity of a slag, and raises slag-covering and removability of a slag. It also realizes improved electric conductivity at a tip of a wire when arc is cut as well as improved re-arc startability. In order to obtain such effect, an addition of $TiO_2$ is required to be no less than 5.5 mass %. On the contrary, an addition exceeding 10.0 mass % of $TiO_2$ induces excessive increase in viscosity of the slag, and consequently raises possibility of formation of such defects as slag inclusion. As $TiO_2$ source, rutile, lucoxin, etc. are effective. More desirable addition range of $TiO_2$ is 5.5 through 8.0 mass %.

"$SiO_2$: 1.5 through 3.0 mass %"

$SiO_2$ has an effect giving smooth strip of globules in a low current region, also addition of $SiO_2$ at the time of thin sheet welding improves arc concentration, and enables easy small beads formation. In order to obtain these effects, an addition of $SiO_2$ is required to be no less than 1.5 mass %, and conversely, when an addition of $SiO_2$ exceeds 3.0 mass %, slag adhesion occurs, leading to degradation of removability. As $SiO_2$ source, addition in a form of oxide, such as silica sands, and compound oxides, such as feldspars, is effective.

"$Al_2O_3$: 0.5 through 1.5 mass %"

$Al_2O_3$ is also a main slag forming ingredient like $TiO_2$ and $SiO_2$, and especially $Al_2O_3$ provides suitable beads form, and it has an effect of raising affinity with base materials. Particularly, $Al_2O_3$ is a raw material effective in adjusting viscosity of a slag, and an addition of no less than 0.5 mass % is required in order to obtain the effect. However, an addition exceeding 1.5 mass % of $Al_2O_3$ excessively raises a viscosity of the slag, and easily provides slag inclusion, and also degrades slag removability. As $Al_2O_3$ source, addition as a form of oxides, such as aluminas, and compound oxides, such as feldspars, is effective.

"Fluorine compounds (by a value expressed in terms of fluorine): 0.10 through 0.15 mass %"

Fluorine compounds are effective for controlling formation of pits and blowholes and for improving porosity resistance. Moreover, they have an effect for promoting separation of globules and particularly for improving arc stability in a low current region. These effects may not be obtained when an addition of fluorine compounds by a value expressed in terms of fluorine is less than 0.10 mass %, and when the addition exceeds 0.15 mass % conversely, it remarkably increases an amount of formation of fume spatter. As source of fluorine, addition in a form of fluorides of alkali metals and alkaline earth metals, such as fluorites, and sodium fluoride, potassium silicofluoride, is effective. Moreover, when organic fluorine compounds, such as PTFE (polytetrafluoroethylene), are included in an outer metal sheath of a wire or in a flux, it exhibits a same effect. In any cases described above, these compounds are added so as to give an amount within the above-mentioned range by a value expressed in terms of fluorine.

"$ZrO_2$: <=0.1 mass %"

In general, $ZrO_2$ increases viscosity of a slag, and it exhibits an effect of improving shape of beads. And particularly it is a component effective in prevention of dropping down of a slag and shape of beads degradation in welding in all position. However, in a slag component system in the present invention, addition of $ZrO_2$ raises hardness of the slag after solidification, and show a tendency of leading to difficulty of slag detachability. Moreover, since a hard slag may firmly cover a wire point when arc is cut, re-arc startability is extremely impaired. For these reasons, addition of $ZrO_2$ is limited to no more than 0.1 mass %.

"Flux rate (i.e., flux ratio): 25 through 45% (mass % of filled flux to a mass of all wire)"

One of special features of the present invention is to set a flux rate high, for example, 25 through 45%, and it is most important factor in order to obtain an effect of the present invention. It is a greatest factor to set a flux rate to 25 through 45% in order to improve welding workability in a low current. That is, when a flux rate is less than 25%, use of a wire having 1.2 mm diameter thickens an outer metal sheath, and does not provide increase in current density, but deteriorates arc condition in a low current welding. Furthermore, when a flux rate is larger than 45%, a thickness of an outer metal sheath becomes excessively small, and therefore a deposition rate rises, and suitable thin sheet welding may not be provided. Moreover, since strength of a wire also extremely falls, feedability deteriorates and stable welding cannot be continued. A more desirable range of a flux rate is 30 through 40%.

"Sum total of a slag forming ingredient: 8 through 14 mass %"

In the present invention, an amount of a slag forming ingredient is defined as total amount of $TiO_2$ and $SiO_2$, $Al_2O_3$, $ZrO_2$, MgO, and FeO (sum total of iron oxides). Fluorine compounds, $Bi_2O_3$, or alkali metal oxides are not included in the slag forming ingredients. It is because that these flux compositions may be easily vaporized, therefore hardly included in a slag, and they do not affect results described below.

In wires having a high flux rate, an amount of slag forming ingredients needs to be limited in order to adjust an amount of weld metals. When an amount of the slag forming ingredients is less than 8 mass % in a wire total weight, an amount of weld metals increases to give large deformation of a base material. Thereby, the amount of the slag decreases, and a whole beads surface may not be uniformly encapsulated, leading to degradation of beads form and slag removability. Moreover, an amount of the slag forming ingredients exceeding 14 mass % gives an excessive amount of the slag. Accordingly, defects, such as slag inclusion, easily occur, and simultaneously the slag covering the beads becomes thicker, leading to difficulty of removing of the slag. More preferably, an amount of the slag forming ingredients is 9 through 12 mass %.

"Other Components"

In order to improve removability of a slag, $Bi_2O_3$ or S may be added as other components other than the above-mentioned components. And Si, Ti, Al, Mn, etc. maybe added as deoxidizing agents, and furthermore, Ni, Cr, Mo, Nb, C, N, or Fe may be suitably added in order to adjust components of a weld metal. However, since Fe is extended during a wire drawing process and allows electric current to flow in a flux in manufacturing of a flux-cored wire electrode, an amount of Fe is preferably regulated no more than 45 mass % of a whole flux. Moreover, a metal outer metal sheath is of stainless steel, components thereof and similarly a cross section form of a wire may not necessarily be specified.

EXAMPLE

Hereinafter, description of effects will be provided about Examples included in a range of the present invention as compared with Comparative example getting out of a range of the present invention. Following Tables 1 through 6 show flux compositions of flux-cored wire electrodes, flux rates, and amounts of slag forming ingredients. And Following Table 7 shows a composition (unit: mass %) of an outer metal sheath comprising stainless steel. An outer metal sheath described in the Table 7 was used to manufacture flux-cored wire electrodes being filled up with fluxes shown in Tables 1 through 6. In addition, composition values of fluxes are represented with mass % to a whole wire mass. In each Table, blank shows that a corresponding component is not substantially included. The diameters of the wires were all 1.2 mm.

TABLE 1

| Remark | | | | | | Example | | | | | | |
|---|---|---|---|---|---|---|---|---|---|---|---|---|
| Wire name | | | 1 | 2 | 3 | 4 | 5 | 6 | 7 | 8 | 9 | 10 |
| Flux | $TiO_2$ | | 6.2 | 5.6 | 9.7 | 6.2 | 6.2 | 6.2 | 6.2 | 6.2 | 6.2 | 6.2 |
| composition | $SiO_2$ | | 2.6 | 2.6 | 2.4 | 1.6 | 3.0 | 2.6 | 2.6 | 2.6 | 2.6 | 2.6 |
| Nonmetallic | $Al_2O_3$ | | 0.7 | 0.7 | 0.7 | 0.7 | 0.7 | 0.6 | 1.5 | 0.7 | 0.7 | 0.7 |
| component | Fluorine | NaF | 0.3 | 0.3 | 0.3 | | | 0.3 | 0.3 | | 0.1 | 0.1 |
| | compound | $K_2SiF_6$ | | | | | | | | 0.2 | 0.2 | 0.1 |
| | | LIF | | | | | 0.1 | | | | | |
| | | $CaF_2$ | | | | | 0.1 | | | | | |
| | | $BaF_2$ | | | | 0.1 | | | | | | 0.1 |
| | | PTFB | | | | 0.1 | | | | | | |
| | Sum total of a value expressed in terms of fluorine | | 0.14 | 0.14 | 0.14 | 0.10 | 0.12 | 0.14 | 0.14 | 0.10 | 0.15 | 0.12 |
| | $ZrO_2$ | | | | | | | | | | | 0.1 |
| | MgO | | | | | | | | | | | |
| | FeO (iron oxides) | | | | | | | 0.2 | | | | |
| | $Bi_2O_3$ | | 0.07 | 0.07 | 0.07 | | | 0.12 | | 0.07 | 0.07 | 0.07 |
| | $Na_2O$ | | 0.13 | 0.13 | 0.13 | 0.10 | 0.10 | | | 0.13 | 0.13 | 0.13 |
| | $K_2O$ | | 0.07 | 0.07 | 0.07 | 0.05 | | 0.10 | 0.20 | 0.07 | 0.07 | 0.07 |

TABLE 2

| Remark | | | | | | Example | | | | | |
|---|---|---|---|---|---|---|---|---|---|---|---|
| Wire name | | 1 | 2 | 3 | 4 | 5 | 6 | 7 | 8 | 9 | 10 |
| Flux | Ni | 1.7 | 1.7 | 1.7 | 1.7 | 2.6 | 1.7 | 1.7 | 2.6 | 2.6 | 2.6 |
| composition | Cr | 5.8 | 5.8 | 5.8 | 5.8 | 10.2 | 5.8 | 5.8 | 5.5 | 5.5 | 5.5 |
| Metal | Mn | 1.4 | 1.4 | 1.4 | 1.4 | 1.4 | 1.4 | 1.4 | 1.3 | 1.3 | 1.3 |
| component | Mo | | | | | 2.3 | | | 2.0 | 2.0 | 2.0 |
| | Nb | | | | | | | 1.2 | | | |
| | C | | | | | | | 0.05 | | | |
| | N | | | | | 0.05 | | | | | |
| | Fe | 14.4 | 14.4 | 14.4 | 14.4 | 14.4 | 14.4 | 14.4 | 8.0 | 8.0 | 6.0 |
| | Si | 0.2 | 0.2 | 0.2 | 0.2 | 0.2 | 0.2 | 0.2 | 0.2 | 0.2 | 0.2 |
| | Ti | | | | | 0.2 | | | | | |
| | Al | | | | | | | | | 0.2 | |
| Flux rate | | 33.6 | 33.0 | 36.9 | 32.4 | 41.5 | 33.7 | 35.6 | 29.8 | 29.7 | 27.8 |
| Sum total of slag formation material | | 9.5 | 8.9 | 12.8 | 8.5 | 9.9 | 9.6 | 10.3 | 9.5 | 9.5 | 9.6 |

TABLE 3

| Remark | | | Example | | | | Comparative example | | | | | |
|---|---|---|---|---|---|---|---|---|---|---|---|---|
| Wire name | | | 11 | 12 | 13 | 14 | 15 | 16 | 17 | 18 | 19 | 20 |
| Flux composition Nonmetallic component | TiO$_2$ | | 6.2 | 7.5 | 5.5 | 9.5 | 5.3 | 10.2 | 6.2 | 6.2 | 6.2 | 6.2 |
| | SiO$_2$ | | 2.6 | 2.6 | 1.8 | 2.8 | 2.6 | 2.3 | 1.3 | 3.2 | 2.6 | 2.6 |
| | Al$_2$O$_3$ | | 0.7 | 1.2 | 0.7 | 0.8 | 0.7 | 0.6 | 0.7 | 0.7 | 0.4 | 1.7 |
| | Fluorine compound | NaF | | | 0.1 | | 0.3 | 0.3 | 0.3 | 0.3 | 0.3 | 0.3 |
| | | K$_2$SiF$_6$ | 0.2 | 0.2 | 0.1 | | | | | | | |
| | | LiF | | | | 0.05 | 0.1 | | | | | |
| | | CaF$_2$ | | | | | 0.1 | | | | | |
| | | BaF$_2$ | 0.1 | 0.1 | | | | | | | | |
| | | PTFB | | | | | | | | | | |
| | Sum total of a value expressed in terms of fluorine | | 0.13 | 0.13 | 0.13 | 0.12 | 0.14 | 0.14 | 0.14 | 0.14 | 0.14 | 0.14 |
| | ZrO$_2$ | | 0.02 | | | | | | | | 0.12 | |
| | MgO | | | | 0.1 | 0.1 | | | | | | |
| | FeO (iron oxides) | | | | | | | | | | | |
| | Bi$_2$O$_3$ | | 0.07 | 0.07 | 0.07 | 0.07 | 0.07 | 0.07 | 0.07 | 0.07 | 0.07 | 0.07 |
| | Na$_2$O | | 0.13 | 0.13 | 0.13 | 0.13 | 0.13 | 0.13 | 0.13 | 0.13 | 0.13 | 0.13 |
| | K$_2$O | | 0.07 | 0.07 | 0.07 | 0.07 | 0.07 | 0.07 | 0.07 | 0.07 | 0.07 | 0.07 |

TABLE 4

| Remark | | Example | | | | Comparative example | | | | | |
|---|---|---|---|---|---|---|---|---|---|---|---|
| Wire name | | 11 | 12 | 13 | 14 | 15 | 16 | 17 | 18 | 19 | 20 |
| Flux composition Metal component | Ni | 1.5 | 3 | 2.6 | 2.6 | 1.7 | 1.7 | 1.7 | 1.7 | 1.7 | 1.7 |
| | Cr | 5.4 | 12 | 10.2 | 10.2 | 5.8 | 5.8 | 5.8 | 5.8 | 5.8 | 5.8 |
| | Mn | 1.0 | 1.4 | 1.2 | 1.2 | 1.4 | 1.4 | 1.4 | 1.4 | 1.4 | 1.4 |
| | Mo | | 2.5 | | | | | | | | |
| | Nb | | | | | | | | | | |
| | C | | | | | | | | | | |
| | N | | | | | | | | | | |
| | Fe | 8.0 | 13.2 | 9.3 | 9.3 | 14.4 | 14.4 | 14.4 | 14.4 | 14.4 | 14.4 |
| | Si | | 0.2 | 0.2 | 0.2 | 0.2 | 0.2 | 0.2 | 0.2 | 0.2 | 0.2 |
| | Ti | | | | | | | | | | |
| | Al | | | | | | | | | | |
| Flux rate | | 26.0 | 44.2 | 32.1 | 37.2 | 32.7 | 37.2 | 32.3 | 34.2 | 33.4 | 34.6 |
| Sum total of slag formation material | | 9.5 | 11.3 | 8.1 | 13.2 | 8.6 | 13.1 | 8.2 | 10.1 | 9.3 | 10.5 |

TABLE 5

| Remark | | | Comparative example | | | | | | |
|---|---|---|---|---|---|---|---|---|---|
| Wire name | | | 21 | 22 | 23 | 24 | 25 | 26 | 27 |
| Flux composition Nonmetallic component | TiO$_2$ | | 6.2 | 6.2 | 6.2 | 5.8 | 8.0 | 5.5 | 9.5 |
| | SiO$_2$ | | 2.6 | 2.6 | 2.6 | 2.1 | 2.9 | 1.5 | 2.9 |
| | Al$_2$O$_3$ | | 0.7 | 0.7 | 0.7 | 0.6 | 1.3 | 0.6 | 1.4 |
| | Fluorine compound | NaF | 0.15 | 0.2 | 0.3 | 0.3 | 0.3 | | 0.3 |
| | | K$_2$SiF$_6$ | | 0.2 | | | | | |
| | | LiF | | | | | | 0.2 | |
| | | CaF$_2$ | | | | | | | |
| | | BaF$_2$ | | | | | | | |
| | | PTFB | | | | | | | |
| | Sum total of a value expressed in terms of fluorine | | 0.07 | 0.19 | 0.14 | 0.14 | 0.14 | 0.15 | 0.14 |
| | ZrO$_2$ | | | | 0.15 | | | | |
| | MgO | | | | | | | 0.1 | 0.2 |
| | FeO (iron oxides) | | | | | | | | 0.2 |
| | Bi$_2$O$_3$ | | 0.07 | 0.07 | 0.07 | 0.07 | 0.07 | 0.03 | 0.11 |
| | Na$_2$O | | 0.13 | 0.13 | 0.13 | 0.13 | 0.13 | 0.06 | 0.21 |
| | K$_2$O | | 0.07 | 0.07 | 0.07 | 0.07 | 0.07 | 0.05 | 0.12 |

TABLE 6

| Remark | | Comparative example | | | | | | |
|---|---|---|---|---|---|---|---|---|
| Wire name | | 21 | 22 | 23 | 24 | 25 | 26 | 27 |
| Flux composition Metal component | Ni | 1.7 | 1.7 | 1.7 | 1.0 | 2.9 | 1.7 | 1.4 |
| | Cr | 5.8 | 5.8 | 5.8 | 4.0 | 10.7 | 5.8 | 5.2 |
| | Mn | 1.4 | 1.4 | 1.4 | 1.0 | 2.0 | 1.4 | 1.0 |
| | Mo | | | | | 2.6 | | |
| | Nb | | | | | | | |
| | C | | | | | | | |
| | N | | | | | | | |
| | Fe | 14.4 | 14.4 | 14.4 | 9.0 | 14.4 | 14.4 | 12.0 |
| | Si | 0.2 | 0.2 | 0.2 | 0.2 | 0.2 | 0.2 | 0.2 |
| | Ti | | | | | 0.5 | | |
| | Al | | | | | | | |
| Flux rate | | 33.4 | 33.7 | 33.7 | 24.3 | 46.1 | 31.5 | 34.7 |
| Sum total of slag formation material | | 9.5 | 9.5 | 9.7 | 8.5 | 12.2 | 7.7 | 14.2 |

TABLE 7

| C | Si | Mn | P | S | Ni | Cr |
|---|---|---|---|---|---|---|
| 0.02 | 0.3 | 1.2 | 0.02 | 0.01 | 9.8 | 18.6 |

Various evaluations were performed using these flux-cored wire electrodes under welding conditions A, B, and C shown in following Table 8. Detailed test methods are shown below.

TABLE 8

| Welding condition | Welding condition | Welding current (A) | Welding voltage (V) | Evaluation item |
|---|---|---|---|---|
| A | 100% $CO_2$ | 100 | 22 | Welding workability, Re-arc startabiity |
| B | | 150 | 26 | Welding workability, X-ray soundness |
| C | | 200 | 30 | Welding workability, Wire feedability |

Figure 2:
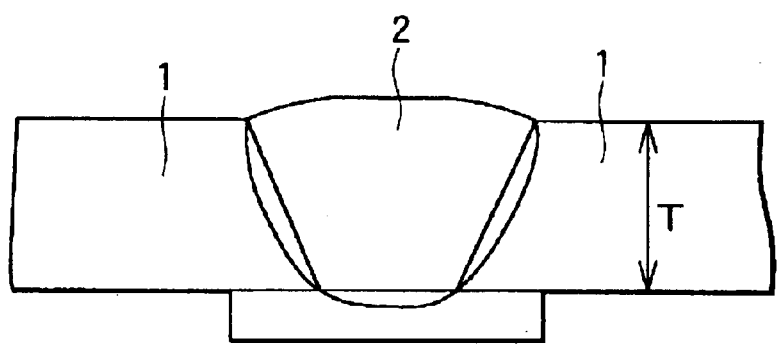
FIG. 2 shows a test method performing flat position multi-layer welding by butt joint, and evaluating welding workability and X-ray soundness.
Figure 3:
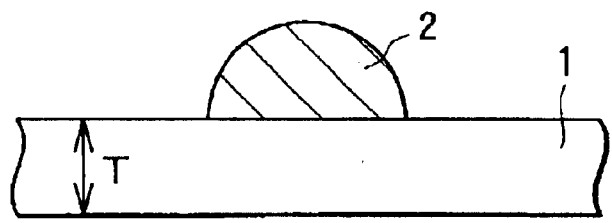
FIG. 3 shows a test method performing build-up welding, on a test sheet, and evaluating welding workability and feedability of a wire.

In a test by a welding condition A, a horizontal fillet welding sheet having a thickness of 2 mm shown in FIG. 1 was evaluated for welding workability and re-arc startability. Test sheets 1 of stainless steel were assembled to form character of "T", and horizontal fillet welding was performed to a part where the test sheets intersect perpendicularly to each other. Referential notation 2 represents a weld metal. Moreover, re-arc startability was evaluated as follows: after arc was cut, a wire tip was held for 30 seconds without cut, and judgment was given based on whether arc was generated smoothly again. This test was repeated 20 times to a same wire, and a percentage of successful tests was evaluated. In a test by a welding condition B, as shown in FIG. 2, stainless steel test sheets 1 were horizontally touched together, and flat position multi-layer welding was given by butt joint, and welding workability and X-ray soundness were evaluated. Evaluation of X-ray soundness was judged based on JIS Z3106. In a test by a welding condition C, as shown in FIG. 3, build-up welding was performed onto a test sheet 1 of stainless steel, and welding workability and feedability of a wire were evaluated. Continuous welding for 15 minutes was performed and wire feedability was evaluated based on occurrence of arc stop. As a test sheet, in every evaluation a stainless steel sheet specified by JIS G4304 or JIS G4305 and having the same component system as the wire was used.

Following Tables 9 through 11 show the evaluation results. In addition, following Table 12 shows criteria for evaluation of ⊚, ○, Δ, and X in these Tables 9 through 11.

TABLE 9

| Remark | | Example | | | | | | | | | |
|---|---|---|---|---|---|---|---|---|---|---|---|
| Wire No. | | 1 | 2 | 3 | 4 | 5 | 6 | 7 | 8 | 9 | 10 |
| Welding workability | Stability of arc | ⊚ | ⊚ | ⊚ | ⊚ | ⊚ | ⊚ | ⊚ | ⊚ | ⊚ | ○ |
| | Arc concentration | ⊚ | ⊚ | ⊚ | ⊚ | ⊚ | ⊚ | ⊚ | ⊚ | ⊚ | ⊚ |
| | Spatter formation | ⊚ | ⊚ | ⊚ | ⊚ | ⊚ | ⊚ | ⊚ | ⊚ | ⊚ | ⊚ |
| | Bead form | ⊚ | ⊚ | ⊚ | ⊚ | ⊚ | ⊚ | ⊚ | ⊚ | ⊚ | ○ |
| | Slag removability | ⊚ | ⊚ | ○ | ⊚ | ⊚ | ⊚ | ⊚ | ⊚ | ⊚ | ⊚ |
| Re-arc startability | | ⊚ | ⊚ | ⊚ | ⊚ | ⊚ | ⊚ | ⊚ | ⊚ | ⊚ | ○ |
| Deformation of base material | | ⊚ | ⊚ | ⊚ | ○ | ○ | ⊚ | ⊚ | ⊚ | ⊚ | ⊚ |
| Wire feedability | | ⊚ | ⊚ | ⊚ | ⊚ | ○ | ⊚ | ⊚ | ⊚ | ⊚ | ⊚ |
| X-ray soundness | | Grade 1 | Grade 1 | Grade 2 | Grade 1 | Grade 1 | Grade 1 | Grade 1 | Grade 1 | Grade 1 | Grade 1 |
| Comprehensive judgment | | ⊚ | ⊚ | ○ | ○ | ○ | ⊚ | ⊚ | ⊚ | ⊚ | ○ |

TABLE 10

| Remark | | Example | | | | Comparative example | | | | | |
|---|---|---|---|---|---|---|---|---|---|---|---|
| Wire No. | | 11 | 12 | 13 | 14 | 15 | 16 | 17 | 18 | 19 | 20 |
| Welding workability | Stability of arc | ○ | ⊙ | ⊙ | ⊙ | △ | ○ | X | ○ | ○ | ○ |
| | Arc concentration | ⊙ | ⊙ | ⊙ | ⊙ | △ | △ | X | ○ | ⊙ | ○ |
| | Spatter formation | ⊙ | ⊙ | ⊙ | ⊙ | △ | ○ | △ | ○ | ⊙ | ○ |
| | Bead form | ○ | ⊙ | ⊙ | ⊙ | △ | △ | △ | ○ | X | △ |
| | Slag removability | ⊙ | ⊙ | ⊙ | ○ | X | △ | ○ | X | ⊙ | △ |
| Re-arc startability | | ⊙ | ⊙ | ⊙ | ⊙ | △ | ⊙ | △ | △ | X | ⊙ |
| Deformation of base material | | ⊙ | ○ | ○ | ⊙ | ○ | ⊙ | △ | ⊙ | ⊙ | ⊙ |
| Wire feedability | | ⊙ | ○ | ⊙ | ⊙ | ⊙ | ○ | ⊙ | ⊙ | ⊙ | ⊙ |
| X-ray soundness | | Grade 1 | Grade 1 | Grade 1 | Grade 2 | Grade 1 | Grade 3 | Grade 2 | Grade 2 | Grade 2 | Grade 3 |
| Comprehensive judgment | | ○ | ○ | ○ | ○ | X | △ | X | X | X | △ |

TABLE 11

| Remark | | Comparative example | | | | | | |
|---|---|---|---|---|---|---|---|---|
| Wire No. | | 21 | 22 | 23 | 24 | 25 | 26 | 27 |
| Welding workability | Stability of arc | X | △ | ⊙ | X | ○ | ○ | ○ |
| | Arc concentration | △ | △ | ⊙ | △ | ○ | ○ | ○ |
| | Spatter formation | △ | X | ⊙ | X | ○ | ○ | ○ |
| | Bead form | △ | ⊙ | △ | △ | ○ | X | ○ |
| | Slag removability | ⊙ | ⊙ | △ | △ | ○ | X | X |
| Re-arc startability | | △ | ⊙ | X | △ | ○ | ○ | ⊙ |
| Deformation of base material | | ⊙ | ⊙ | ⊙ | ⊙ | X | X | ⊙ |
| Wire feedability | | ⊙ | ⊙ | ⊙ | ⊙ | X | ⊙ | ○ |
| X-ray soundness | | Grade 2 | Grade 1 | Grade 1 | Grade 3 | Grade 3 | Grade 1 | Grade 3 |
| Comprehensive judgment | | X | X | X | X | X | X | △ |

TABLE 12

| | Welding condition | ⊙ | ○ | △ | X |
|---|---|---|---|---|---|
| Stability of arc | A (according to Table 8) | Very excellent | Excellent | Poor | Not applicable |
| Arc concentration | A | Very excellent | Excellent | Poor | Not applicable |
| Amount of spatter formed | C | No more than 1.0 g/minute | Exceeding 1.0 g/minute and no more than 1.5 g/minute | Exceeding 1.5 g/minute and no more than 2.0 g/minute | Exceeding 2.0 g/minute |
| Bead form | Tested in 3 conditions of A, B, and C | Very excellent | Excellent | Poor | Not applicable |
| Slag removability | Tested in 3 conditions of A, B, and C | Very excellent | Excellent | Poor | Not applicable |
| Re-arc startability | A | Re-arc started no less than 80% | No less than 60%, less than 80% | No less than 40%, less than 60% | Less than 40% |
| Deformation of base material | A | Very excellent | Excellent | Poor | Not applicable |
| Wire feedability | C | No arc stop for 15 minutes | Arc stopped no less than 10 minutes, and up to 15 minutes | — | Arc stopped in less than 10 minutes |
| X-ray soundness | B | | According to evaluation by JIS | | |

Amount of spatter formed is a value obtained when welding was performed under a welding condition of C for 1 minute, then whole amount of spatter formed was collected and weight was measured.

Wires No.1 through 14 belong to Examples of the present invention, and it exhibits extremely excellent welding workability, re-arc startability, and X-ray soundness in a low current region in flat position and level fillet welding.

On the other hand, a wire No.15 has a content of $TiO_2$ of less than 5.5 mass %, and shows a result inferior in a state of arc and re-arc startability, especially in removability of a slag. In a wire No.16, a content of $TiO_2$ exceeding 10 mass % raises viscosity of a slag, and gives slag inclusion, and therefore a result inferior in X-ray soundness is shown. A wire No.17 has a content of $SiO_2$ of less than 1.5 mass %, and a result inferior in stability and concentration of arc is shown. A wire No.18 has a content of $SiO_2$ of exceeding 3.0 mass %, extremely deteriorates removability of the slag, and gives seizure on a surface of beads. A wire No.19 has a content of $Al_2O_3$ of less than 0.5 mass %, and shows inferior conformability with a base material of beads. Moreover, since it has a content of $ZrO_2$ pf exceeding 0.10 mass %, it exhibits remarkable inferior re-arc startability.

A wire No.20 has a content of $Al_2O_3$ of exceeding 1.5 mass %, and it gives a high viscosity of a slag and inferior X-ray soundness with slag inclusion. A wire No.21 has a value expressed in terms of fluorine in fluorine compounds of less than 0.10 mass %, and shows inferior arc stability and inferior X-ray soundness in a low current region. A wire No.22 has a value expressed in terms of fluorine in fluorine compounds of exceeding 0.15 mass %, and provides a very large quantity of spatter formed. A wire No.23 has a content of $ZrO_2$ exceeding 0.1 mass %, and shows remarkably inferior re-arc startability, and inferior slag removability. A wire No.24 has a sum total of flux of less than 25 mass %, and shows inferior arc stability and poor property in amount of spatter formed in a low current region.

A wire No.25 has a sum total of flux exceeding 45 mass %, and shows inferior feedability of a wire, and therefore an increased amount of weld metals provides large deformation of the base material. A wire No.26 has a sum total of slag forming ingredients of less than 8.0 mass %, and provides inferior slag removability and beads form, and thereby an excessive amount of weld metal provides large deformation of the base material. A wire No.27 has a sum total of exceeding 14 mass % of slag forming ingredients, and shows inferior slag removability, and inferior X-ray soundness is shown caused by a large amount of slag inclusion.

The foregoing invention has been described in terms of preferred embodiments. However, those skilled, in the art will recognize that many variations of such embodiments exist. Such variations are intended to be within the scope of the present invention and the appended claims.

What is claimed is:

1. A flux-cored wire for stainless steel arc welding comprising:

an outer metal sheath made of stainless steel; and flux filled up in said outer metal sheath made of stainless steel, said flux comprising:

$TiO_2$ 5.5 through 10.0 mass % as percentage to the total weight of the wire;

$SiO_2$ 1.5 through 3.0 mass % as percentage to the total weight of the wire;

$Al_2O_3$ 0.5 through 1.5 mass % as percentage to the total weight of the wire; and fluorine compound (by a value expressed in terms of fluorine) 0.10 through 0.15 mass % as percentage to the total weight of the wire, wherein a flux ratio of the wire is 30 through 45%, and a total amount of slag forming ingredient is 8 through 14 mass % as a percentage to the total weight of the wire.

2. The flux-cored wire for stainless steel arc welding according to claim 1, wherein $ZrO_2$ included in the flux is limited to no more than 0.1 mass % to the total weight of the wire.

3. The flux-cored wire for stainless steel arc welding according to claim 1, wherein a diameter of the wire is no less than 1.2 mm.

4. The flux-cored wire for stainless steel arc welding according to claim 1, wherein said flux ratio of the wire is 30 through 40%.

5. The flux-cored wire for stainless steel arc welding according to claim 1, wherein a total amount of slag forming ingredients included in said flux is 9 through 12 mass % to the total weight of the wire.

6. A method of making a flux-cored wire, the method comprising filling an outer metal sheath made of stainless steel with a flux; and producing the wire of claim 1.

* * * * *